March 23, 1965      C. A. McFADDEN      3,174,735
FURNACE WITH BURNER MEANS

Filed March 13, 1963      3 Sheets-Sheet 1

INVENTOR.
CHARLES A. McFADDEN
BY
Busser, Smith & Harding

ATTORNEYS

March 23, 1965  C. A. McFADDEN  3,174,735
FURNACE WITH BURNER MEANS
Filed March 13, 1963  3 Sheets-Sheet 2
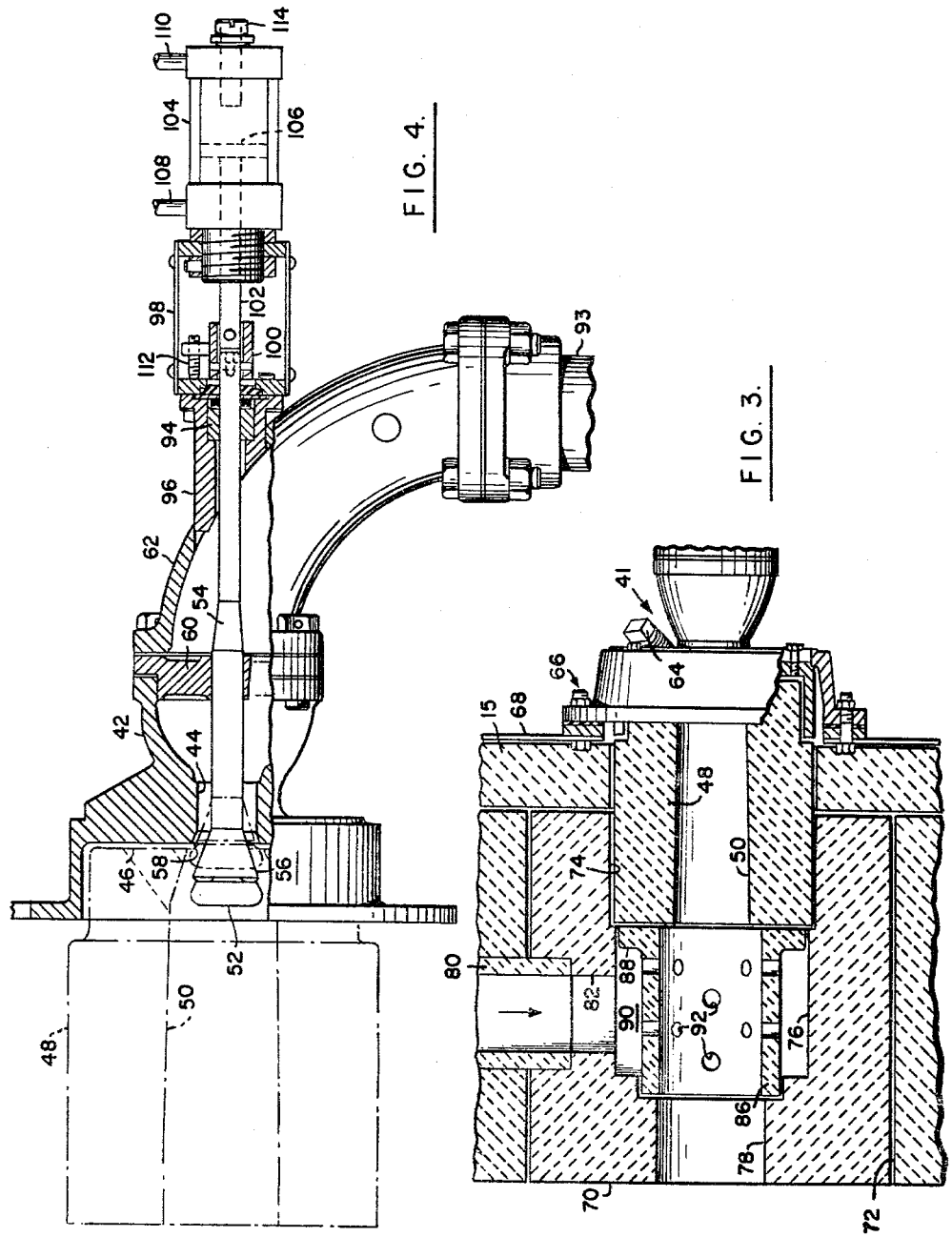
INVENTOR.
CHARLES A. McFADDEN
BY
Busser, Smith & Harding
ATTORNEYS

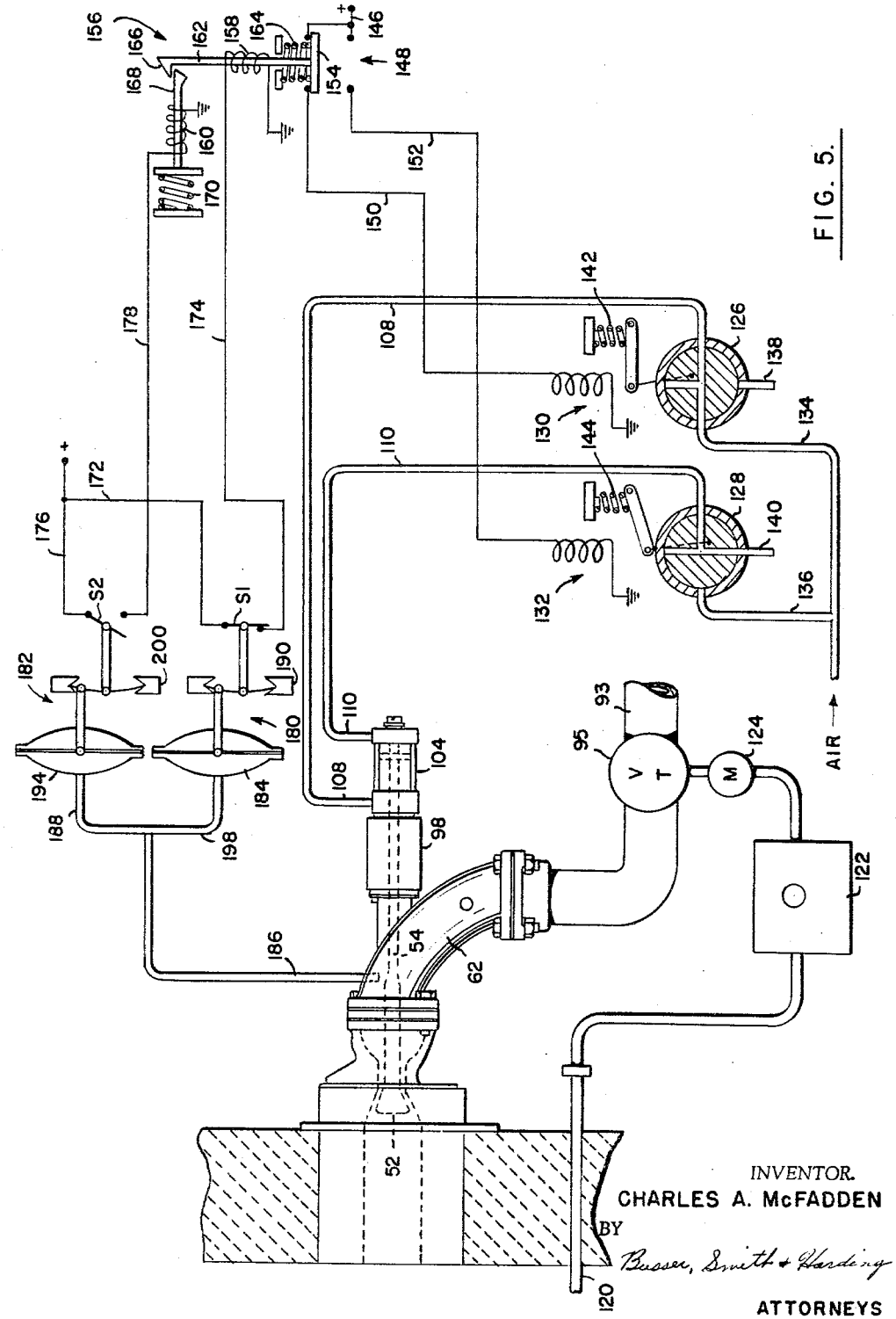

United States Patent Office 3,174,735
Patented Mar. 23, 1965

3,174,735
FURNACE WITH BURNER MEANS
Charles A. McFadden, Medford, N.J., assignor to Bickley Furnaces, Incorporated, Philadelphia, Pa., a corporation of Pennsylvania
Filed Mar. 13, 1963, Ser. No. 264,895
8 Claims. (Cl. 263—43)

This invention relates to burner means for furnaces and, more particularly, to burner means for use in low thermal gradient heat processing as in ceramic furnaces or kilns.

In kilns it is essential that the heating be controlled so that the work or ware may be heated from room temperature to red heat at a rate that will not destroy the ware. If the temperature at the surface of the ware is raised too rapidly, a high temperature gradient within the ware may cause damage, as by cracking. In the heat treating of ceramic material, it is desirable that the temperature gradient within the ware be maintained as low as possible as the ware is heated. Also, it is desirable that the ware be heated uniformly throughout its surface area and that spot heating be avoided.

When convection heat transfer is employed in kilns, the rate of heat transfer may be increased by increasing the mass velocity of the gas stream or by increasing the temperature differential. Increasing the temperature differential has the disadvantage that it may result in a high temperature gradient within the ware. However, by increasing the mass velocity of the gas stream, a greater weight of fluid is moved past the ware at higher velocities which produces more uniform heating throughout the kiln without providing a damaging temperature differential. Convection heat transfer is desirable in kilns since it can be readily controlled and is employed in the kiln in accordance with this invention.

In the operation of the burner assemblies heretofore used in kilns, the initial portion of the heating cycle is controlled by throttling the burner to the minimum safe burning rate. While this mode of operation liberates a relatively small amount of heat, the heat is liberated at the temperature of the flame which is, for natural gas and air, approximately 3200° F. Hence, the portions of the ware in the proximity of each burner used in the kiln are contacted by a low velocity stream of hot gases. This high temperature gas stream rapidly gives up its heat to the ware surface in the proximity of the burner and to the furnace wall whereby the ware is non-uniformly heated. Also, since the gas stream is buoyant by reason of its low density and high temperature, it will rise to the top of the furnace chamber before passing completely across the furnace chamber. Hence, the ware at the lower end of the furnace chamber and spaced from the burner a distance beyond the point at which the gas stream begins to rise will have little or no contact with the gas stream whereas the ware close to the gas stream has contact with an excessively hot gas stream. This results in spot heating of the ware.

The aforementioned problems have been overcome by the use of a firing system as disclosed in U.S. Patent No. 3,055,652 wherein air is admixed with the fully burned products of combustion of the burners to thereby lower the temperature of the gas stream and increase its mass velocity. Hence, the harmful effect of excessive gas stream temperatures is minimized and the ware is uniformly heated because the gas stream has added velocity to carry it all the way across the furnace chamber before it begins to rise. Localized spot heating is avoided by removing and shielding the burner combustion chamber from the heating chamber of the kiln.

An object of this invention is to provide a burner means for the kiln which can throttle over an operating range substantially greater than previously known burners. The turn-down range, i.e., the maximum fuel input divided by the minimum fuel input, of a typical high quality pre-mix type gas burner in use today is approximately 5:1. The maximum fuel input is limited by a condition whereby the flame will lift off the burner port and the burner will blow out, which condition occurs if the burner is operated at too high a pressure. The minimum fuel input is limited by a condition whereby the flame will propagate back through the burner port to cause backfiring, which condition occurs if the burner is operated at too low a pressure. In accordance with this invention, there is provided a dual range burner means which is actuated between a low fire position providing a small burner port and a high fire position providing a large burner port, the burner being actuated in accordance with a control system responsive to the burner pressure. By employing the principles of this invention, the turn-down range of burner means of the indicated type has been increased to 25:1.

The increased operating range of the dual range burner means in accordance with this invention permits the use of kilns or the like at extremely high temperatures where the fuel input demand is very high and, at the same time, the kiln may be operated with controlled firing at very low temperatures without sacrificing control capability or temperature uniformity.

Prior techniques for achieving a wide firing range temperature for kilns have involved special ware arrangements for protecting the ware and have required the attendance of a skilled operator who turns some of the burners on and off, operates exhaust ports between open and closed positions and makes other firing adjustments. Turning some burners on and off has the disadvantage that there is a loss of temperature uniformity throughout the kiln because the incoming heat is no longer distributed uniformly but is entering through only a portion of the burners. The burner system in accordance with this invention will permit heat control of such accuracy that the firing operation may be fully automated.

The above and other objects and features of the invention will appear more fully from a consideration of the following detailed description in conjunction with the accompanying drawings wherein:

FIGURE 3 is a fragmentary sectional view of a burner assembly in accordance with this invention;

FIGURE 4 is a sectional view of a burner in accordance with this invention; and

FIGURE 5 is a schematic illustration of a burner control system in accordance with this invention.

Figure 1:
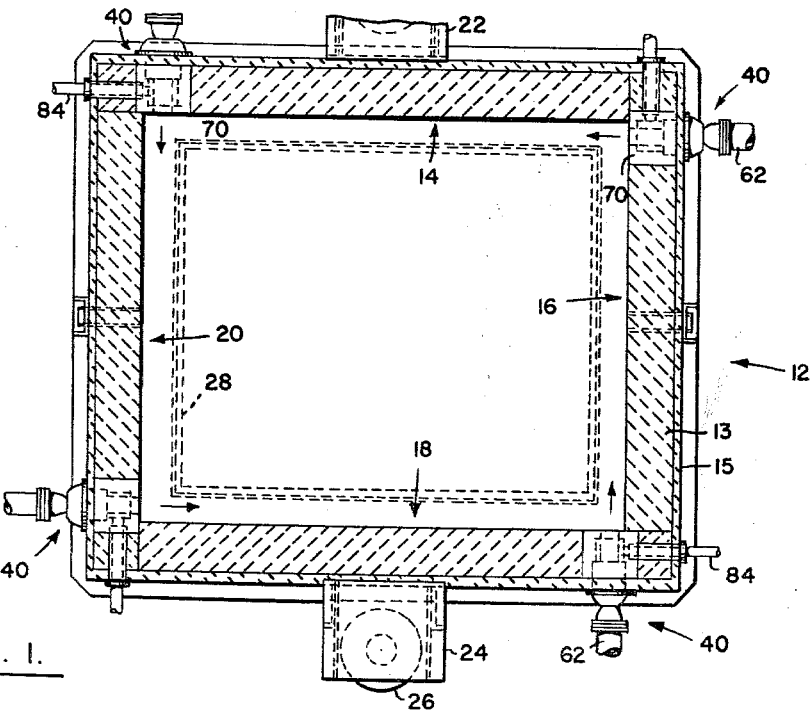
FIGURE 1 is a sectional plan view of a kiln in accordance with this invention.
Figure 2:
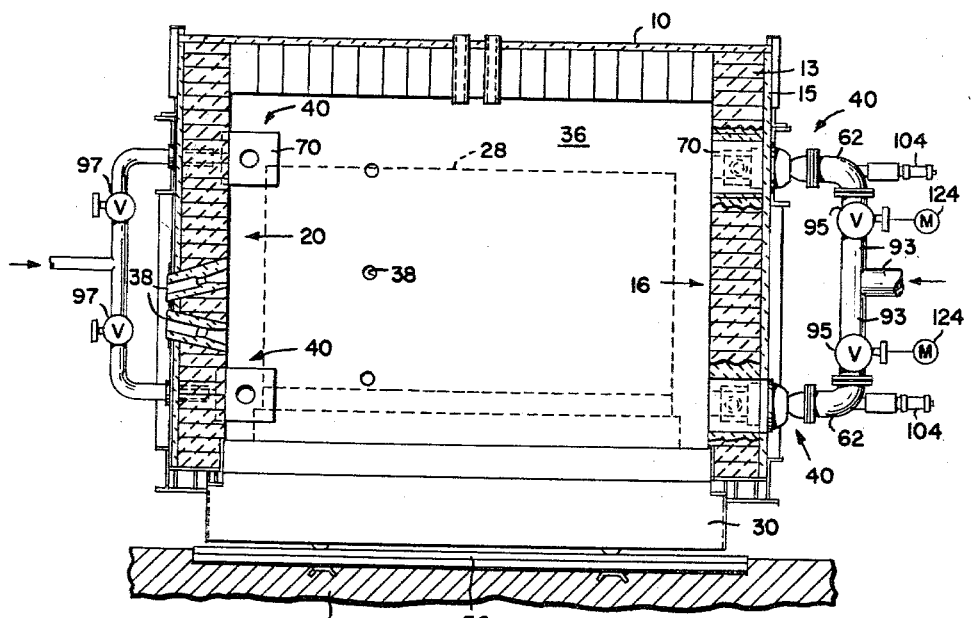
FIGURE 2 is a sectional elevational view of a kiln in accordance with this invention.

As shown in FIGURES 1 and 2, one form of kiln in accordance with this invention is rectangular in form having a ceiling 10 and a rectangular vertical wall 12 comprising walls 14, 16, 18 and 20. A pair of brackets 22 and 24 are mounted on oppositely disposed sides 14 and 18, respectively, and are cooperable with the supporting rods 26 of a hydraulic lift (not shown) which serves to raise and lower the kiln by means of brackets 22 and 24. The ware, the outline of which is indicated at 28, is supported on a kiln base 30 which is movable laterally on a track 32 in the floor 34. The bottom of vertical wall 12 is open and is adapted to cooperate with base 30 to enclose the ware 28 within a kiln heating chamber 36 defined by ceiling 30, vertical wall 12 and base 30. After the ware is positioned on the base 30, the wall and ceiling structure is raised by the hydraulic lift to permit movement of the base 30 beneath the wall and ceiling structure at which time the latter is lowered onto the base 30 to enclose the ware 28.

Ceiling 10 and wall 12 comprise an inner layer 13 of blocks of refractory material and a relatively thin outer shell 15 of block insulation. Base 30 comprises layers of blocks of refractory material. Mounted in wall 12 are suitable sight holes, as shown at 38, through which the ware 28 may be observed during the heating operation.

The burner assemblies for heating the ware 28 are indicated at 40 and are mounted in the vertical wall 12. One layer of burner assemblies is circumferentially spaced about wall 12 at the level of the lowermost portion of the ware. Another layer is provided at the upper end of the kiln. It will be apparent that the number of vertical layers of burner assemblies 40 is dependent upon the height of the kiln and the ware to be heated. In each layer, one of the burner assemblies 40 is positioned in each side of the wall 12 to direct a flame along an adjacent side as is shown by the arrows in the FIGURE 1. For example, the burner assembly mounted in side 18 directs a flame along side 16, and the burner assembly mounted in side 16 directs a flame along the side 14. By this arrangement, the burner assemblies may provide a gas stream completely encircling the ware as will be hereinafter described. It is noted that the ware is spaced from the wall 12 so that the gas stream issuing from the burner assemblies 40 will not directly contact any portion of the ware.

Each burner assembly 40 comprises a suitable gas burner 41 of the type having a combustion chamber at its downstream end. The burner 41 disclosed herein is a gas burner comprising a body 42 having a cylindrical neck portion 44. Body 42 is cemented at 46 to a refractory block 48 adjacent neck 44. Block 48 defines a combustion tunnel 50 communicating with the interior of body 42 downstream of neck 44. A burner nose plug 52 is formed on the end of a stem 54 and has a conical portion 56 cooperating with an opposed conical wall 58 to define an annular burner orifice or port. Wall 58 is formed at the downstream end of neck 44. The conical configuration of the plug portion 56 and the wall 58 are similar whereby the opposed walls are parallel.

In operation, the burners 41 are provided with a suitable gaseous fuel-air mixture through elbows 62. The burner 41 has a pilot connection 64 for ignition of the fuel-air mixture as it issues from burner orifice, the combustion of which takes place largely in the combustion tunnel 50.

Suitable mounting means, indicated generally at 66, are provided for mounting the burners 41 in the vertical wall 12. Each burner 41 is secured to a mounting bracket 68 fastened to the shell 15 with block 48 extending through an opening in shell 15. A rectangular block 70 of refractory material is positioned in a rectangular opening 72 in the inner layer 13 of wall 12 and has a recess 74 adapted to receive the downstream end of the block 48. Burner block 70 has a central cavity 76 adjacent the upstream end of recess 74 and a bore 78 communicating with the upstream end of central cavity 76. Cavity 76 and bore 78 thus define a passageway to the heating chamber 36 through which the products of combustion from tunnel 50 pass.

A ceramic conduit 80 is mounted in wall 12 and communicates at its downstream end with a passageway 82 formed in burner block 70. Passageway 82 communicates with central cavity 76. Conduit 80 and passageway 82 provide a path for the flow of air into cavity 76 from the air supply conduits 84 which are connected to the upstream end of the conduits 80. Since air is diffused with the products of combustion from tunnel 50 in cavity 76, this cavity may be termed a diffusion chamber.

A cylindrical diffuser member 86 is mounted in central cavity 76 and defines, at the inner wall thereof, a passageway between tunnel 50 and bore 78. The inner wall of diffuser member 86, tunnel 50 and bore 78 are all in alignment. Diffuser member 86 has a radially extending flange 88 which positions the diffuser member 86 within cavity 76 so that the diffuser member outer wall is spaced from the wall of cavity 76 whereby an annular chamber 90 is formed adjacent the diffuser member outer wall. Diffuser member 86 has a plurality of radial openings 92 extending therethrough and circumferentially and longitudinally spaced thereabout. Openings 92 serve to meter or control the amount of air passing from chamber 90 through the diffuser member 86 into the products of combustion passing from the combustion tunnel 50 of burner 41. Openings 92 may extend at an angle toward the interior of the kiln in order to minimize the back pressure on the burner 41. Diffuser member 86 is made of a material which can withstand extreme thermal shock and thermal stress, such as silicon, carbide, silicon nitride, fireclay or other ceramics. Also, heat resistant metals of a chromium-nickel composition may be suitable, as for example, "Inconel," "Nichrome" or "Hastelloy."

Means are provided for varying the size of the orifice of the burner in accordance with an object of this invention to provide a dual range operation. To this end, stem 54 projects out of elbow 62 and is supported for axial movement by a spider 60 mounted in body 42 and a bearing 94 mounted in housing 96 on the exterior of elbow 62. The outer end of stem 54 projects into a housing 98 mounted on the end of housing 96 and is connected to a coupling 100 which connects stem 54 with a rod 102. An air cylinder 104 is mounted on the end of housing 98 and receives the rod 102 which is secured to the usual piston 106 which is actuated between a pair of positions within cylinder 104.

The air for actuating cylinder 104 is supped through conduits 108 and 110 which communicate with the cylinder chamber on opposite sides of the piston 106. Adjustable stop screws 112 and 114 are provided for setting the limits of the stroke of the piston. As viewed in FIGURE 4, stop screw 112 limits movement of the piston 106 to the left by contacting the wall of housing 98 and stop screw 114 limits movement of the piston to the right by contacting the piston 106. When air is supplied through the conduit 110, the piston is actuated to the left position wherein the plug 52 is in the high fire position providing a maximum burner opening as is shown in full lines in FIGURE 4. When air is supplied through conduit 108, the piston is actuated to the right position wherein the plug is in the low fire position defining a minimum burner orifice as shown in dotted lines in FIGURE 4. Air cylinder means of the type disclosed are conventional mechanism and may be of any suitable type well known in the art.

In the firing of the kiln, a fuel-air mixture is supplied to the burners 41 through conduits 93 which are connected to elbows 62 and have valves 95 serially connected therein for regulating the amount of fuel-air mixture passing to the burners 41. Air or a suitable inert gas is supplied to conduit 80 through conduits 84 which have valves 97 connected serially therein for regulating the amount of air or inert gas passing to the chamber 90. The valves 95 and 97 are adjusted either manually or automatically to provide the desired flame temperature and the length of the gas stream passing from the burner assemblies. In order to insure that all of the ware is heated uniformly the length of the gas stream passing from the burner assemblies 41 is adjusted so that the gas stream passes completely around wall 12 whereby a gas stream completely encircles the ware before any of the gas stream begins to rise because of its buoyancy.

The fuel-air mixture passes from the body 42 through the burner orifice into combustion tunnel 50 where it is ignited. The combustion of the fuel-air mixture takes place largely in the tunnel 50. The products of combustion leave combustion tunnel 50 at a temperature of from 2500° F. to 3200° F. and pass into the central opening in diffuser member 86. The secondary air passes from conduit 80 into annular chamber 90 from which the air passes through openings 92. Diffuser member 86 serves to meter the air and cause it to mix in small jets with the fully burned combustion products passing from the combustion tunnel 50. The diffuser member 86 insures that there is a thorough mixture or diffusion of the air and the products of combustion by reason of the plurality of openings 92 which direct the small jets of air at right angles into the products of combustion. Since the air is at room temperature which is considerably lower than the burner combustion products, the air will serve to lower the temperature of the gas stream passing into the heating chamber 36. Thus, diffuser member 86 is subjected to extreme thermal shock and temperature stresses and must be capable of withstanding such stresses.

By admixing room temperature air with the products of combustion passing from combustion tunnel 50, the temperature of the resultant gas stream entering the heating chamber 36 may be lowered to 500° F. or lower and the mass velocity of the resultant gas stream may be increased theoretically by six times. Thus, the harmful effects of excessive gas stream temperatures is eliminated and the ware throughout the heating chamber 36 is uniformly heated because the gas stream has adequate velocity to carry all the way around the heating chamber 36 before rising because of its buoyancy. The gas stream which encircles the ware comprises a plurality of individual gas streams each issuing from one of the burner assemblies 40 and passing along one of the sides of wall 12 between the issuing burner assembly and the location at which the adjacent burner assembly, which is mounted in the side along which the gas stream passes, issues a gas stream.

Means are provided for actuating the plug 52 between the high fire and the low fire positions thereof during firing of the furnace, said plug actuation being made responsive to the burner supply pressure, i.e., the pressure of the fuel-air mixture at the inlet of the burner. Of course, the burner pressure is a function of the flow of the fuel-air mixture through the regulating valve 95 which is adjusted in accordance with the temperature condition to be maintained within the furnace.

As shown in FIGURE 5, the means for adjusting valve 95 to maintain a desired temperature in the furnace comprises a thermocouple 120 which extends into the furnace chamber 36 to sense the furnace temperature at a location which will provide an accurate temperature indication. The furnace temperature sensed by the thermocouple 120 energizes the thermocouple which transmits a signal representing the furnace temperature to a pyrometer 122 which is set for the desired temperature. The pyrometer 122 controls operation of a motor 124 which adjusts the throttle valve 95 to vary the flow of fuel-air mixture to the burner 41. Of course, the pyrometer 122 may be set to various temperatures throughout a heating cycle either manually or by suitable automatic control means.

If the temperature in the furnace is less than the set temperature, the pyrometer effects operation of the motor in a direction to cause an opening movement of the throttle valve 95 whereby more fuel-air mixture is supplied to burner 41 with the result that the temperature of the gases introduced into the furnace chamber is raised. On the other hand, if the temperature in the furnace is greater than the set temperature of the pyrometer 122, the pyrometer causes operation of the motor in a direction to cause a closing movement of the throttle valve 95 with the result that less fuel-air mixture is supplied to the burner whereby the temperature of the gases introduced into the furnace chamber is reduced. It will be apparent that the thermocouple, the pyrometer and the motor operated valves are conventional and are well known to those skilled in the art wherefore a detailed description thereof is deemed unnecessary.

The burner control system shown in FIGURE 5 comprises means for supplying air through conduits 108 and 110 to actuate the air cylinder 104 between the pair of positions thereof, during which operation the burner plug 52 is moved between its high fire and low fire positions. Such means comprises a pair of three-way valves 126 and 128 operated by solenoids 130 and 132, respectively. Air is supplied to valves 126 and 128 by conduits 134 and 136, respectively, communicating with a suitable high pressure air supply (not shown). Valves 126 and 128 are also provided with air bleed conduits 138 and 140, respectively. The armature of solenoid 130 is connected to a rotatable valve member of valve 126 and actuates the same between a pair of positions as the armature is moved pivotally between its attracted and released positions by the solenoid coil. When the coil of solenoid 130 is energized to place the armature in its attracted position, the valve 126 is positioned as shown in FIGURE 5 with the valve chamber thereof providing communication between conduit 108 and supply conduit 134. When the coil of solenoid 130 is deenergized, the armature is released and is moved to a released position away from the coil by a suitable spring 142, during which movement the valve member of valve 126 is rotated in a clockwise direction as viewed in FIGURE 5 to a position in which the valve chamber provides communication between conduit 108 and bleed conduit 138. When the coil of solenoid 132 is energized to place the armature in its attracted position, the valve is positioned so that the valve chamber provides communication between conduit 110 and supply conduit 136. When the coil of solenoid 132 is deenergized, the armature is released and moved to a released position away from the coil by a suitable spring 144, during which movement the valve member of valve 128 is moved in a clockwise direction to a position in which the valve chamber provides communication between conduit 110 and the bleed conduit 140 (as shown in FIGURE 5).

Circuit means are provided for energizing one or the other of the solenoid coils 130 and 132. To this end, the positive supply terminal of a suitable source of electrical energy is connected through a line 146, a switch 148 and a line 150 to the coil of solenoid 130 which is grounded to complete a circuit for energizing the same. Also, the positive supply terminal is connected through line 146 and switch 148 and a line 152 to the coil of solenoid 132 which is grounded to complete a circuit for energizing such coil. The switch 148 has a switch arm 154 and is part of a relay 156 which actuates switch arm 154 between a pair of positions for supplying current to one or the other of the solenoids 130 or 132.

The relay 156 is of the latch-release type comprising what may be termed a latch coil 158 and a release coil 160. The armature 162 of relay 156 carries the switch arm 154 at its lower end and is biased to the released position by the usual relay spring 164. The upper end of armature 162 is provided with a latch hook 166. A latch arm 168 is arranged for reciprocation transversely of armature 162 by means of the release coil 160 and is cooperable with the hook 166 to engage the same and hold the armature 162 in the latched position against the bias of relay spring 164. The latch arm 168 is biased into the engaging position by a spring 170 when the release coil 160 is not energized. Upon energization of this release coil 160, the latch arm 168 is moved out of engagement with hook 166 to permit downward movement of armature 162 under the bias of spring 164. Latch arm 168 and hook 166 have cooperable sloping surfaces so that latch arm 168 is cammed to the left as the armature moves upwardly, the latch arm 168 moving back to the right to engage the hook 166 as the sloping surfaces move out of contact.

Circuit means are provided for controlling energization of the coils 158 and 160 of relay 156 in accordance with the burner supply pressure. Such means comprises a circuit from the positive supply terminal through the release coil 158 to ground and comprising a line 172, a switch S1 and a line 174. There is also provided a circuit from the positive supply terminal through a line 176, a switch S2, a line 178 to coil 160 which is grounded to complete the circuit.

Switches S1 and S2 are actuated between open and closed positions by pressure responsive means indicated generally at 180 and 182, respectively. Pressure responsive means 180 comprises a conventional pressure responsive diaphragm means 184 having a chamber communicating with the interior of elbow 62 by way of conduits 186 and 198. The diaphragm of the pressure responsive means 184 is movable in accordance with the pressure variations in elbow 62 and is connected to a snap-acting mechanism 190 which is connected to switch S1. The diaphragm means is constructed to actuate the snap-acting mechanism 190 to snap between its two positions in response to the occurrence of predetermined control pressures (i.e. the burner pressure) as is well known in the art. Pressure responsive means 182 comprises a conventional pressure responsive diaphragm means 194 having a chamber communicating with the interior of elbow 62 by way of conduits 186 and 188. The diaphragm of the pressure responsive means 194 is movable in response to the pressure variations sensed and is connected to a snap-acting mechanism 200 which is connected to switch S2. The diaphragm means 194 and snap-acting mechanism 200 are set in accordance with well known practices so that the latter will snap between its two positions in response to the occurrence of predetermined control pressures. The pressure responsive means 180 is set to operate at low pressures while the pressure responsive means 182 is set to operate at higher pressures as will be described more fully hereafter.

It will be apparent that the pressure responsive diaphragm means and the snap-acting mechanisms of the indicated type are conventional and the details of these devices and the manner of their use are known to those skilled in the art. Accordingly, the diagrammatic illustration and general discussion of these mechanisms is deemed to be a sufficient description thereof.

To illustrate the operation of the control system in accordance with this invention, let it be assumed that initially the parts are positioned as shown in FIGURE 5. In this position of the system, the burner 41 is in the low fire position with the plug 52 defining a small burner orifice. This position has been attained by the occurrence of a low burner pressure $P_1$ whereby the pressure responsive means 180 has been snapped to the left position to close the switch S1. This condition may occur when the temperature condition in the kiln is in accordance with the setting of the pyrometer 122 whereby the valve 95 has been adjusted to a small flow position so that the burner pressure will be low. The parts will remain in this position until the burner pressure increases to a pressure $P_2$ at which time the diaphragm means 184 is moved to the right an amount to effect a snap action of the snap-acting means 190 to effect opening of switch S1. This will occur a short time after the plug 52 moves to the low fire position because of a rapid burner pressure buildup as a result of the reduction in the burner orifice size.

The opening of switch S1 results in deenergization of the latch coil 158. However, since the latch arm 168 engages hook 166, the switch arm 154 will be maintained in the position shown in FIGURE 5 to effect energization of solenoid 130 and deenergization of solenoid 132. The burner may now operate over the low fire range without any actuation of the nose plug 52. Accordingly, the valve 95 may be adjusted by the action of the thermocouple 120, pyrometer 122 and motor 124 to maintain various firing conditions and various fuel-air flow rates.

It is noted that in this condition of the control system, air is supplied through conduit 134, the valve chamber of valve 126 and conduit 108 into the air cylinder 104 to maintain the nose plug 52 in the low fire position. During the low fire range of the system, the pressure responsive means 182 maintains switch S2 open since the burner pressure is maintained below that pressure necessary to effect snap action of the snap-acting mechanism 200 from the left to the right position thereof.

When the burner pressure exceeds the upper limit of the low fire range, namely, pressure $P_3$, the burner will be shifted to the high first position thereof. This would occur when the thermocouple and pyrometer are indicating an increased demand for fuel as in the case when higher temperatures in the furnace are needed. Accordingly, the throttle valve 95 is permitting a substantial flow of the air-fuel mixture to the burner which results in the increased burner pressure.

With the occurrence of this pressure $P_3$, the pressure responsive means 182 is operated to effect a snap action of the mechanism 200 to the right to close the switch S2 thereby completing a circuit through the release coil 160. Since the switch S1 had been opened previously, the coil 158 is deenergized. Accordingly, armature 162 is moved downwardly under the action of relay spring 164 to close the lower switch contacts of switch 148 by means of the switch arm 154. At the same time, the upper switch contacts of switch 148 are opened. The change in the position of switch arm 154 results in the energization of the coil of solenoid 132 and the deenergization of the coil of solenoid 130. This results in the movement of the armature of solenoid 132 upwardly to the attracted position whereby the valve member of valve 128 is rotated in a counterclockwise direction to a position providing communication between supply conduit 136 and conduit 110. At the same time, the armature of solenoid 130 is moved away from the coil thereof to effect clockwise movement of the valve member of valve 126 to a position providing communication between the conduit 108 and the bleed conduit 138. This last-mentioned action is effected by means of the spring 142.

The valves 126 and 128 are now in a position to provide an air supply to the cylinder 104 which will cause movement of the piston 106 to the left whereby the nose plug 152 will be actuated to the high fire position. This air flow is from the air supply through conduit 136, the valve chamber of valve 128, conduit 110, and into the chamber of cylinder 104 on the right side of the piston 106. The high pressure air effects movement of the piston to the right during which movement air is exhausted from the cylinder by way of conduit 108, the valve chamber of valve 126 and the bleed conduit 138.

When the burner is placed in the high fire position, the burner pressure will drop rapidly to a pressure $P_4$ which is substantially less than the pressure $P_3$ but greater than pressure $P_1$. With this drop in pressure, the pressure responsive means 182 is operative to snap switch $S_2$ to the open position thereof thereby deenergizing coil 160. When this occurs, the spring 170 returns the latch arm 168 to the latching position thereof. In the high fire position, the burner pressure may vary over a range $P_1$ to $P_5$ which is similar to the low fire pressure range. However, in the high fire range, greater fuel is effected.

As the fuel demand drops and the burner pressure drops below the pressure $P_1$, the switch over point during turn-down is achieved. At this point the pressure responsive means 180 is operative to effect a snap action of the mechanism 190 from the right position to the left position thereof as shown in FIGURE 5 to thereby close the switch S1. This results in energization of latch coil 158 whereby the armature 162 will be raised to the position shown in FIGURE 5 to move the switch arm 154 from the lower position to the upper position. At the same time, a hook 166 engages the latch arm 168 to hold the armature in its upper position. This movement of the switch arm 154 changes the condition of switch 148 to cause energization of the coil of solenoid 130 and deenergization of the coil of solenoid 132. When this occurs, the valve members of valves 126 and 128 are returned to the positions shown in FIGURE 5. This is brought about by movement of the armature of solenoid 130 to the attracted position and movement of the armature of solenoid 132 to the released position by the action of spring 144. Air is new supplied from conduit 134 through a valve chamber of valve 126 and conduit 108 to the left side of piston 106 to effect movement thereof to the right. This piston movement causes the exhaust of air from the cylinder through conduit 110, the valve chamber of valve 128 and the bleed line 140.

The nose plug 52 is now returned to the low fire position defining a small burner orifice. This will result in a rapid pressure buildup at the inlet of the burner whereby in a short period the burner pressure will increase substantially to a pressure $P_6$ which will be somewhat less than the high pressure $P_5$ but greater than the pressure $P_2$. Accordingly, the diaphragm means 104 of pressure responsive means 180 is actuated toward the right to effect a snap action of the mechanism 190 to the right and the opening of switch S1. This results in deenergization of the coil 158. However, the armature 162 is in the latched position and cannot return to the released position until the release coil 160 is energized. The burner will now operate in the low fire range between pressures $P_1$ and $P_3$.

It will be apparent that the control system for the burner will actuate the dual range burner between the low fire position and the high fire position in accordance with the burner pressure as discussed above during firing of the kiln. By constructing the burner so that the burner orifice area in the low fire position is approximately 25 percent of the burner orifice area when the plug is in the high fire position, an overall turn-down range of 25 to 1 may be achieved. In other words, the rate of flow of fuel through the burner at the maximum pressure $P_5$ in the high range will be twenty-five times greater than the fuel flow rate at the minimum pressure $P_1$ of the low fire range. Accordingly, there is provided in accordance with this invention a burner means for a furnace which has the ability to throttle over an operating range five times as great as burners used heretofore.

It will be apparent that changes may be made in the construction and arrangement of parts without departing from the scope of the invention. For example, the system may be applied to various types of heat treating furnaces. Also, the burner can be constructed to operate without diffusion air although this is preferable in most applications. It is thus not desired to be limited except as required by the following claims.

What is claimed is:

1. A burner assembly for the heating of furnaces comprising a burner having means defining a burner inlet chamber, means defining a burner orifice downstream of said inlet chamber including a plug member movable between a high fire position and a low fire position to provide a large burner orifice and a relatively small burner orifice, respectively, and a combustion tunnel open at its downstream end, means for delivering fuel to said burner inlet chamber, means for actuating said plug member between said positions thereof in response to the pressure of the fuel in said inlet chamber, said last-mentioned means being responsive to an increase in pressure over a first control pressure for actuating said plug member from said low fire position to said high fire position and responsive to a decrease in pressure in said inlet chamber below a second control pressure to actuate said plug member from said high fire position to said low fire position, a burner block defining a diffusion chamber in unrestricted communication with the downstream end of said combustion tunnel, means defining a passageway communicating at its downstream end with said diffusion chamber, said burner directing its products of combustion from said combustion tunnel into said diffusion chamber, and means for supplying sufficient air to said diffusion chamber through said passageway to cause admixture of said air with the burner products of combustion whereby the mass velocity of the gas stream leaving said burner block is greater than the mass velocity of said burner products of combustion.

2. A furnace comprising means defining a heating chamber adapted to receive the work to be heated and including a refractory wall for providing a wall of the heating chamber encircling the work, a plurality of individual burner assemblies providing individual heating gas streams and mounted in said wall at circumferentially spaced positions, each of said burner assemblies comprising means defining an annular burner orifice including a wall defining the periphery of said burner orifice, and a plug mounted within said wall in opposed spaced relation relative thereto, said plug and said wall cooperating to define said burner orifice therebetween, means mounting said plug for movement toward and away from said wall to change the size of said burner orifice, means connected to said plug and operable between a pair of positions for actuating said plug between a low fire position and a high fire position, the size of said burner orifice in said high fire position being substantially greater than the size thereof in said low fire position, and means for supplying fuel to said burner upstream of said burner orifice.

3. Means for heating a furnace having a heating chamber defined by a refractory wall comprising a plurality of burner means mounted on said refractory wall to direct a heating gas stream into the heating chamber of the furnace, each of said burner means having an inlet chamber, means defining an annular burner orifice including a wall defining the periphery of said burner orifice and a plug member cooperable with said wall and movable between a high fire position and a low fire position to provide a large burner orifice and a relatively small burner orifice, respectively, means for delivering fuel to said inlet chamber at various rates in accordance with the heat demand of said furnace, means connected to said plug member for actuating the same between said positions thereof, and means responsive to the fuel pressure in said inlet chamber for controlling movement of said plug actuating means between a pair of positions whereby said plug member is moved between said high fire and low fire positions thereof.

4. Heating means according to claim 3 wherein said control means comprises means responsive to a first pressure condition in said inlet chamber for moving said actuating means from one position thereof to the other so that said plug member is moved from said high fire position to said low fire position, and means responsive to a second pressure condition in said inlet chamber for moving said actuating member from said other position to said one position so that said plug member is moved from said low fire position to said high fire position.

5. Heating means according to claim 4 wherein said actuating means comprises a fluid operated means, and said control means includes a valve means for supplying fluid under pressure to said fluid operated means for moving the same to one or the other positions thereof.

6. Heating means according to claim 5 wherein said control means includes a solenoid for actuating each of said valves to one or the other of a pair of controlling positions, and means for controlling the energization of said solenoid including a relay movable between an attracted position and a released position.

7. Heating means according to claim 6 wherein said control means includes circuit means for energizing one of said valve solenoids when said relay is in its attracted position and the other of said valve solenoids when the relay is in its released position, and a pair of pressure responsive switches for controlling the energization of said relay, one of said pressure switches being responsive to a high presusre in said inlet chamber to effect energization of said relay to one of its controlling positions and the other of said pressure responsive switches being responsive to a low pressure in said inlet chamber to effect energization of said relay to the other of its controlling positions.

8. Heating means according to claim 3 wherein each burner means has means defining a diffusion chamber arranged to receive the burner products of combustion as they pass into the heating chamber and means for introducing gas at a temperature lower than said products of combustion into said diffusion chamber for admixture with said products of combustion.

References Cited in the file of this patent

UNITED STATES PATENTS

| | | |
|---|---|---|
| 2,296,256 | Bloom | Sept. 22, 1942 |
| 2,594,206 | Payne | Apr. 22, 1952 |
| 2,838,106 | Thomas | June 10, 1958 |
| 3,055,652 | Remmey et al. | Sept. 25, 1962 |